United States Patent [19]

Furlong et al.

[11] 3,879,502
[45] Apr. 22, 1975

[54] FILL HANGER

[75] Inventors: Donn B. Furlong; Samuel Luzaich, both of Santa Rosa, Calif.

[73] Assignee: Ecodyne Corporation, Chicago, Ill.

[22] Filed: Aug. 17, 1973

[21] Appl. No.: 389,292

Related U.S. Application Data

[62] Division of Ser. No. 341,006, March 16, 1973, Pat. No. 3,799,516, which is a division of Ser. No. 63,150, Aug. 12, 1970, Pat. No. 3,749,381.

[52] U.S. Cl. ............................. 261/111; 261/DIG. 11
[51] Int. Cl. .............................................. B01f 3/04
[58] Field of Search ...................... 261/111, DIG. 11

[56] References Cited
UNITED STATES PATENTS

| | | | |
|---|---|---|---|
| 3,468,521 | 9/1969 | Furlong et al. | 261/111 |
| 3,643,931 | 2/1972 | Henning et al. | 261/DIG. 11 |

*Primary Examiner*—Tim R. Miles
*Attorney, Agent, or Firm*—Joel E. Siegel; Charles M. Kaplan

[57] ABSTRACT

A fill assembly for a cooling tower comprising a plurality of fill strips positioned within the fill area, a plurality of spaced apart vertically suspended fill hangers positioned transversely with respect to said fill strips within said fill area, said fill hangers having a plurality of substantially horizontally and generally vertically extending members which intersect one another to form a plurality of parallelogram grids, each of said fill strips being supported by a horizontal portion of one of said parallelogram grids of at least two of said fill hangers, and each of said parallelogram grids including means associated with said vertically extending members to retain said fill strips in a predetermined position relative to said horizontal portion. Also provided are unique snap-lock joints to attach adjacent fill hanger sections and horizontal and transverse stabilizers to increase the stability of the fill assembly.

2 Claims, 12 Drawing Figures

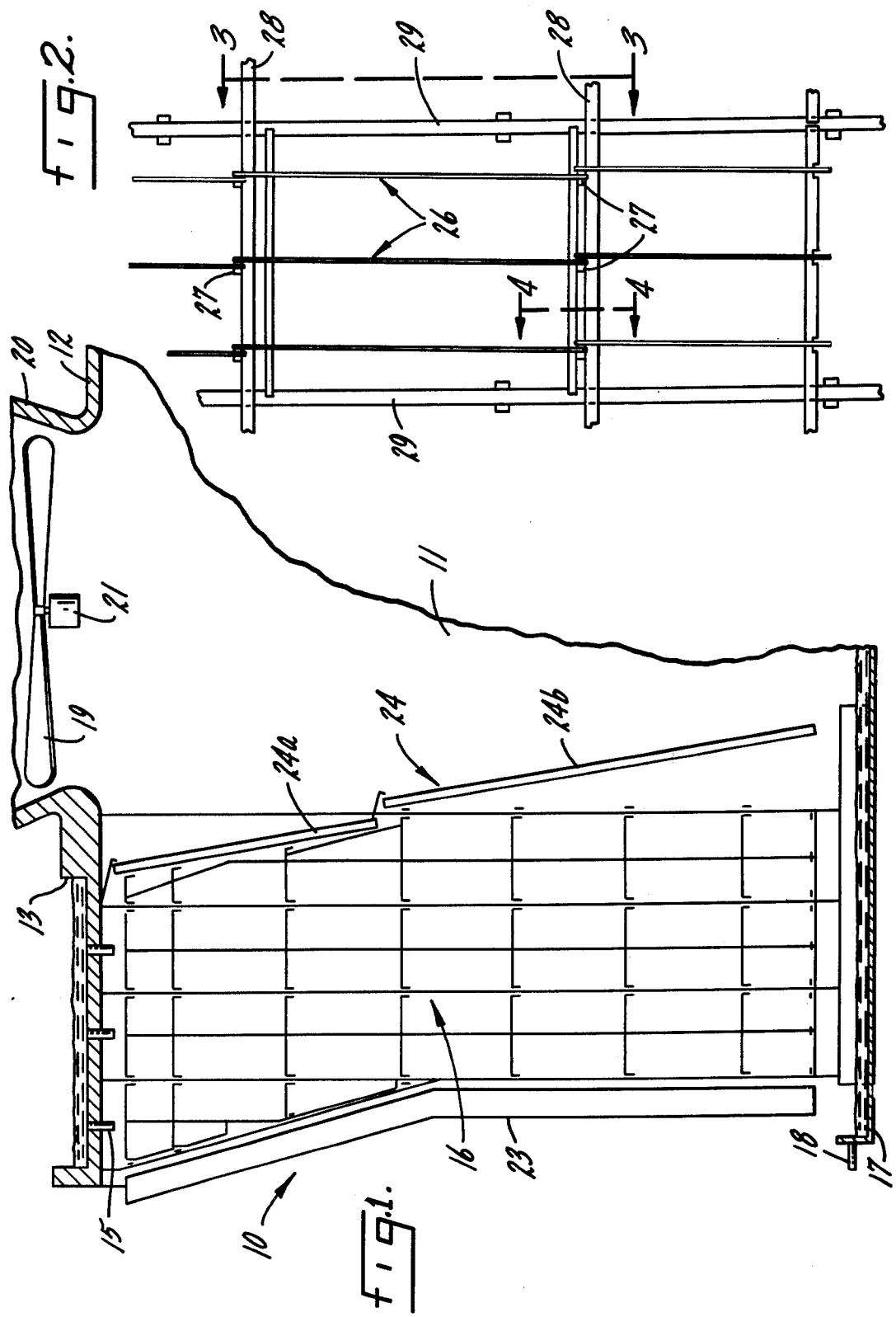

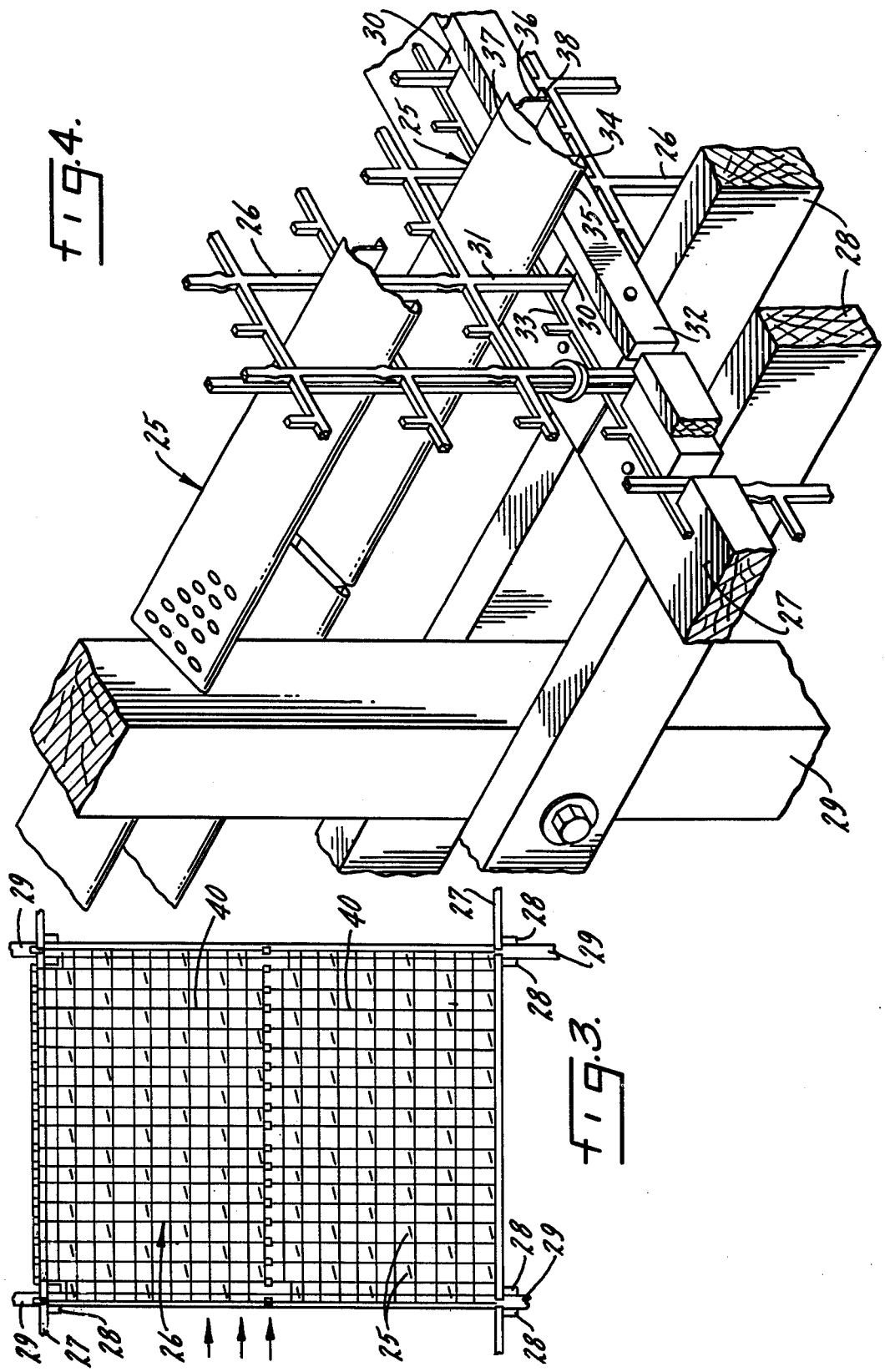

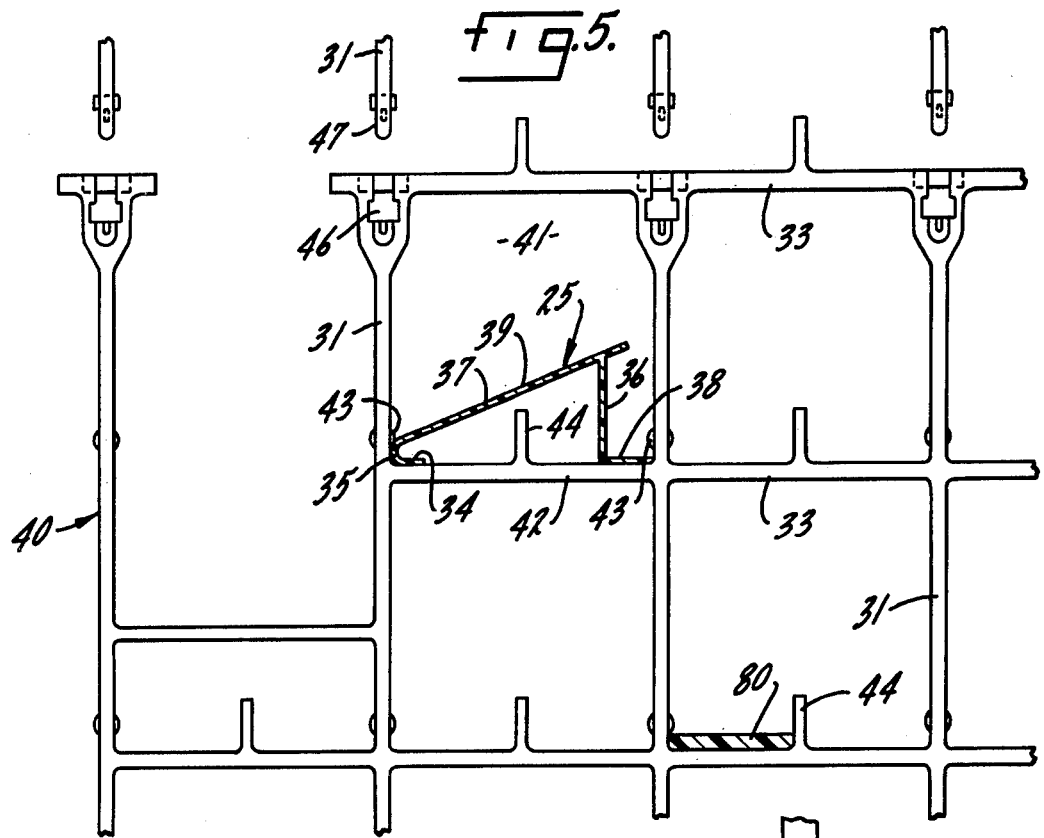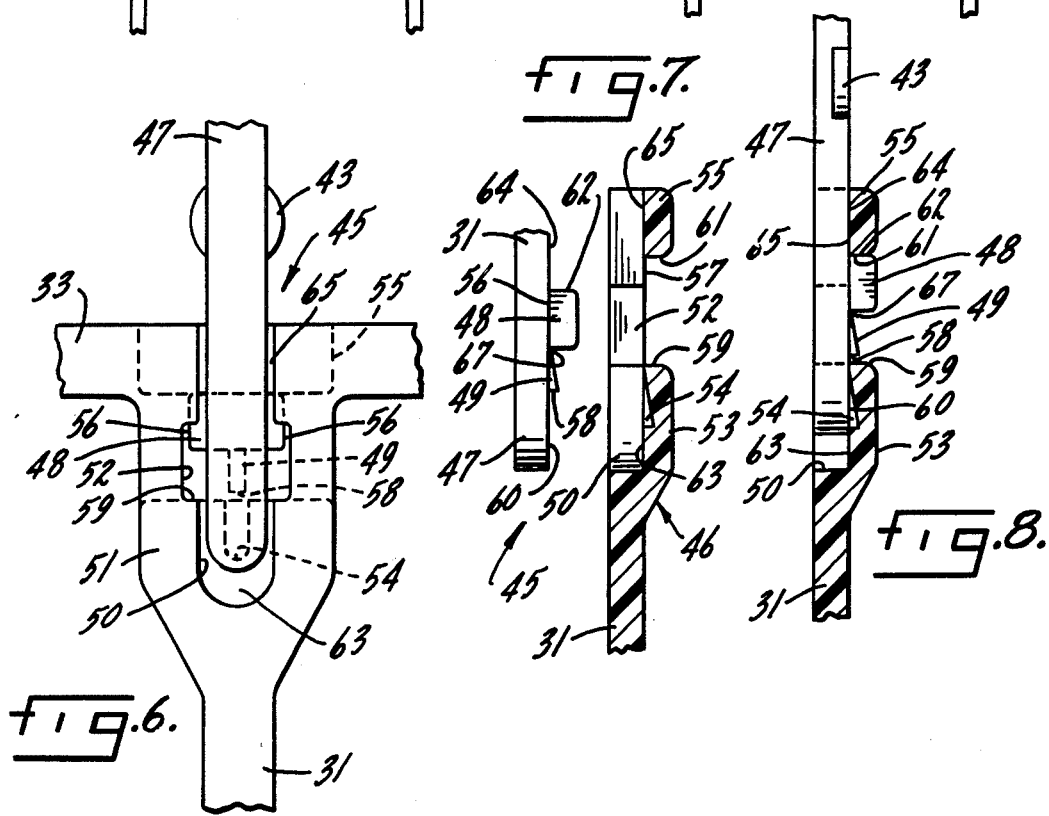

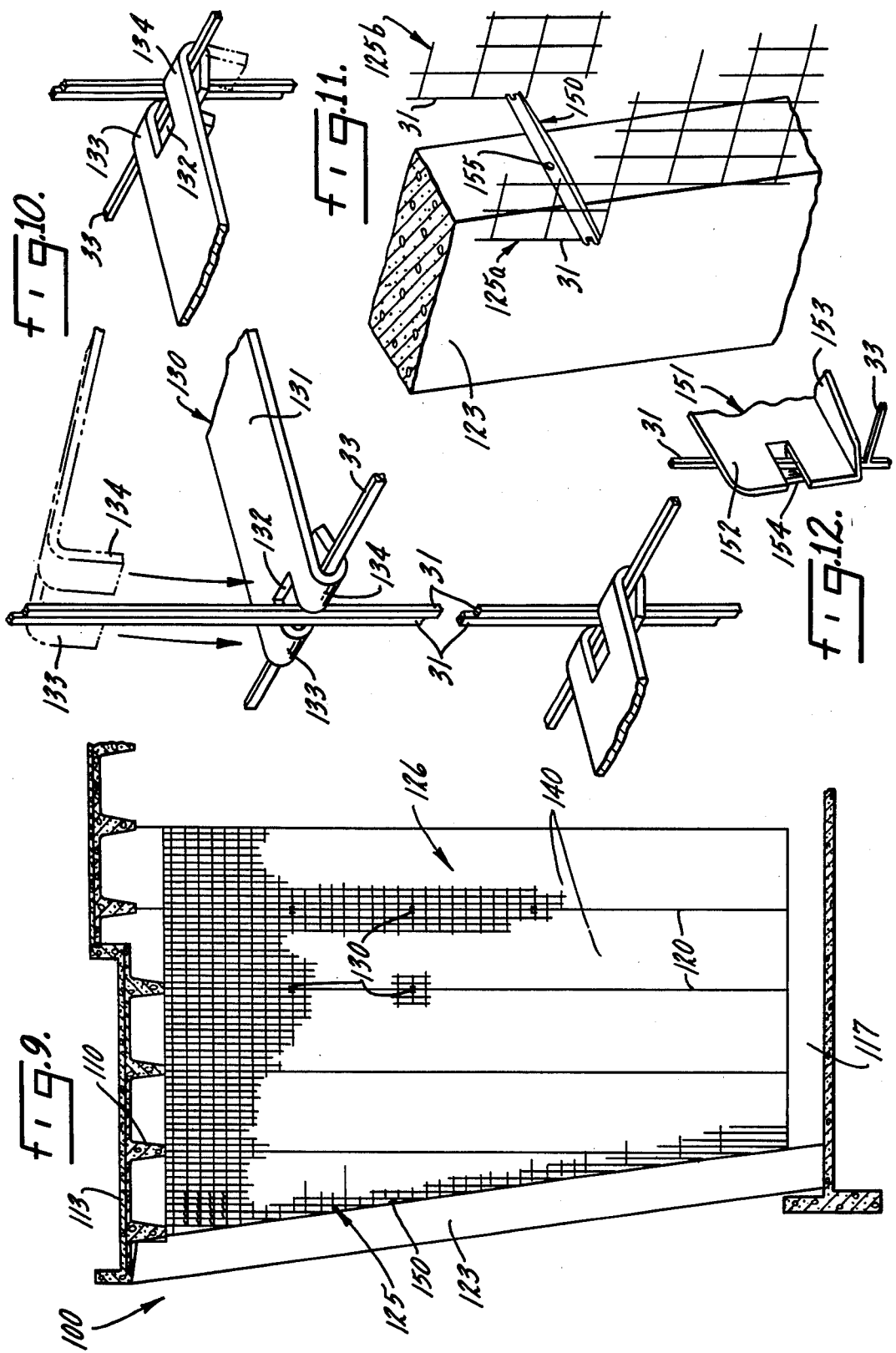

FILL HANGER

This is a division of application Ser. No. 341,006, filed Mar. 16, 1973 and now U.S. Pat. No. 3,799,516, which was a division of application Ser. No. 63,150, filed Aug. 12, 1970 and now U.S. Pat. No. 3,749,381.

BACKGROUND OF THE INVENTION

This invention relates generally to splash assemblies for use primarily in mechanical or natural draft water cooling towers of the crossflow and counterflow types and more specifically concerns fill hangers of novel design such as will more efficiently support cooling tower fill strips.

Crossflow towers typically are constructed to have a basic shell or enclosure on two vertical end walls, with louvered openings located at the two opposite side walls to pass air laterally into the tower interior. At the top of the tower are one or more fans rotating in shrouds or housings for discharging heated air from the tower; and along each side hot water distribution basins. Hot water from the latter is distributed by metering orifices to fall within the tower, wherein it is broken up into droplets by splashing on the fill strips, the water also filming on such strips. The air cooled water is ultimately collected in a cool water basin structure at the bottom of the tower, for recirculation to the heat source.

Counterflow towers typically are constructed to have a basic shell or enclosure on all sides with louvered openings located at the lower portion of from two to four side walls for air admission to the tower. The top of the tower is covered with decking on which are mounted one or more fans rotating in housings for discharging the heated vapor laden air from the tower. Hot water (to be cooled) is distributed over the fill portion of the tower by troughs or piping systems with outlet nozzles. Hot water from these nozzles falls within the tower, where it is broken up into droplets by splashing on the fill strips, the water also filming on such strips. The cooled water is ultimately collected in the cold water basin at the bottom of the tower, for recirculation.

Cooling is accomplished essentially by evaporation from the surface of droplets and films, and by sensible heat transfer from water surfaces to the circulating air. The air velocity through the filling, and the elapsed time of free fall of water through the filling are of importance in effecting the heat transfer. The fill strip configuration and spacing relative to adjacent fill strips determines, to a degree, the time of fall. The more closely spaced the fill strips, the longer the water is exposed to the air currents within the tower, with resulting greater evaporation and sensible heat transfer to the air. As a practical limit to the amount of fill utilized, the pressure drop of air through the fill increases with the amount of fill, requiring more fan horse power to maintain such air movement. Further, the fill strip configuration and spacing determines the rate and extent of water splash and resulting breakup into water particles. The greater the breakup, the greater the exposure of water droplets to circulating air; hense, the greater the heat transfer.

The earliest splash fill supports consisted of wooden beams nailed to the posts of the tower at desired vertical spacing. Such supports in the cross flow arrangement ran parallel to the air flow, to avoid blocking the air flow. Fill strip assemblies were in turn nailed to the beams, to maintain the desired horizontal spacing. Subsequent arrangements included notched or nailed vertical posts serving as both supports and spacers. Deterioration from fungus attack sometimes weakened these posts, causing the fill section to collapse. Several arrangements to permit hanging the fill supports have been utilized. Notched wooden hangers were used. These were sometimes subject to fungus attack. Cords made of polyester, with loops or grid deck supports were used. Unequal stretching of suspenders resulted in alignment problems. Woven galvanized and coated steel wire hangers have been used but were difficult to hold in place. Most of the above arrangements require support beams on four to eight foot centers vertically. This caused some added resistance to air movement. All of the heretofore fill supports mentioned above aren't satisfacotry because they lack durability due to attack by fungus, or corrosion, or they result in added resistance to air movement, or they require extensive time and expense for field erection.

SUMMARY OF THE INVENTION

It is the primary object of this invention to provide a fill strip hanger assembly that is highly corrosion and fungus resistant and possesses exceptional strength and rigidity.

Another object is to provide a fill strip hanger assembly that reduces to a minimum resistance to air movement.

A further object of the invention is to provide a fill strip hanger that can be quickly and easily erected in the field.

Still another object is to provide a fill strip hanger that retains the fill strips in a fixed predetermined position.

A still further object is to provide a fill strip hanger that is constructed of a material that will not support combustion.

The fill assembly of the present invention comprises a plurality of fill strips positioned within the fill area; a plurality of spaced apart vertically suspended fill hangers positioned transversely with respect to the fill strips within the fill area; the fill hangers comprise a plurality of substantially horizontally and generally vertically extending polyvinylchloride members which intersect one another to form a plurality of parallelogram grids; each of the fill strips are supported by the horizontal portion of one of said parallelogram grids of at least two of said fill hangers; each of the fill hangers include a plurality of fill hanger sections which are attached one atop of another; each section is attached to the section immediately below by connecting means integral with the vertically aligned adjacent vertical members; and the connecting means includes a male portion associated with the lower end of one of the vertical members which is received by the female portion associated with the upper end of the other adjacent vertical member. Inwardly projecting beads are provided on each of the vertical members a short distance from the point of intersection with the horizontal members to retain the end portions of the fill strips between the beads and the horizontal members. In addition, horizontal stabilizers and transverse stabilizers are provided to increase the rigidity of the fill assembly.

All the above-mentioned and additional features and objects of the invention, together with the details of il-

DESCRIPTION OF THE DRAWINGS

FIG. 1 is a partial vertical section taken through a representative crossflow wood frame cooling tower illustrating the fill area of the tower;

FIG. 2 is an enlarged view of a portion of the fill area shown in FIG. 1 showing the fill hanger sections of the present invention in greater detail;

FIG. 3 is an elevational view taken along line 3—3 of FIG. 2;

FIG. 4 is a perspective view taken about line 4—4 of FIG. 2 illustrating the fill strips supported by the fill hangers of the present invention;

FIG. 5 is an elevational view illustrating a portion of two adjacent fill hanger sections, having a fill strip supported thereon, prior to interlocking connection;

FIG. 6 is an enlarged front elevational view illustrating the male and female portions of the snap-lock connecting means in the locked position;

FIG. 7 is an enlarged side elevational view illustrating the male and female portions of the snap-lock connecting means prior to interlocking connection;

FIG. 8 is an enlarged side elevational view illustrating the male and female portions of the snap-lock connecting means in the locked position;

FIG. 9 is a view similar to FIG. 1 showing an alternative fill area structure in conjunction with a concrete cooling tower;

FIG. 10 is an enlarged perspective view illustrating a horizontal stabilizer, in the crimped position in solid lines, and in the position prior to crimping in phantom lines;

FIG. 11 is an enlarged perspective view illustrating a transverse stabilizer between two adjacent fill hangers; and FIG. 12 is an enlarged perspective view illustrating the connecting portion of the transverse stabilizer.

DESCRIPTION OF THE PREFERRED EMBODIMENTS

Referring to FIG. 1, a crossflow cooling tower 10 is shown as having a housing 11 incorporating a top 12 defining a hot water distributing pan 13. Liquid, such as water to be cooled, is pumped into pan 13 from which the liquid drains via suitable nozzles 15. After descending through the spalsh fill area 16, the liquid is collected in basin 17 for removal at outlet 18.

A fan 19 rotatable in stock 20 by drive 21 draws air laterally through the tower for upward discharge via stack 20. The air passes successively through openings between housing side inlet louvers 23, the fill area 16 and through drift eliminator 24. In FIG. 1 the eliminator louvers appear in two groups, 24a and 24b.

Referring to FIGS. 2–4, fill strips 25 are supported by fill handers 26 of the present invention, extending in vertical planes which are transversely placed in directions parallel to the length extents of louvers 23. Hangers 26 may be suitably supported, as by lateral supports 27 carried by ties 28 on vertical posts 29. The supports 27 may be notched at 30 to receive upwardly extending members 31 of the hangers, the notches then being covered by battens 32 to retain the hangers in position. The top horizontal member 33 of the hanger is typically carried on the support 27.

Fill strips 25, as shown in FIGS. 4 and 5, are of the type disclosed in U.S. Pat. No. 3,468,521 to Furlong et al, which is assigned to the assignee of the present invention. Strip 25 has a forward leg 34 defining convex surface 35 and a rearward leg 36 spaced laterally from leg 34. Leg 36 has an overall vertical dimension substantially greater than the overall vertical dimension of 34, and the strip includes webbing 37 interconnecting the legs and defining an upper surface 39. Foot 38 projects laterally from rear leg 36 through a horizontal plane which passes through the lowermost point on surface 35.

As seen in FIG. 3, fill hanger 26 includes a plurality of interconnected fill hanger sections 40. FIG. 5 shows each section 40 having a plurality of substantially horizontal members 33 and a plurality of substantially vertical upwardly extending members 31 which intersect one another to form a plurality of parallelogram grids 41. Each fill strip 25 is supported on the horizontal portion 42 of grid 41. Each grid has inwardly projected beads 43 integral with member 31 positioned a short distance above the intersection of horizontal portion 42 with vertical members 31. Beads 43 extend inwardly a sufficient distance to prevent surface 35 and foot 38 of fill strip 25 from lifting an appreciable distance above horizontal portion 42. Strip 25 is formed of a flexible material thereby allowing it to be forced past beads 43 and installed in position immediately below beads 43, as shown in FIG. 5. Member 44, integral with horizontal portion 42, extends upwardly a short distance intermediate the ends of horizontal portion 42. This permits conventional bar-type fill 80 to be supported between member 44 and member 31 on horizontal portion 42 while being retained in place by beads 43, as seen in FIG. 5.

The uppermost portion of member 31 of each hanger section 40 has a female portion 46 associated therewith which receives a male portion 47 associated with the lowermost portion of member 31 of the section immediately above, and thereby connects together two vertically aligned sections 40. Connecting means 45, which includes female portion 46 and male portion 47, provides a unique snap-lock joint that has load-carrying capability independent of the direction of any applied load which could exist in practice.

As seen in FIGS. 6-8 male portion 47 includes a horizontally extending rectangular ear defining member 48 integrally connected to member 31, a short distance above the lower end thereof. Member 48 extends a short distance beyond the sides of member 31, so as to define ears 56 and is postioned rearwardly thereof. Wedge 49 is integrally connected to member 31 immediately below member 48 intermediate the sides of member 31 such that its tip 67 contacts the bottom of member 48. Female portion includes a U-shaped slot 50 cut-out of enlarged upper end portion 51 of member 31 so as to receive male portion 47 therein. Notches 52 enlarge slot 50 so as to permit member 48 to pass therethrough. A first abutment member 53, having a wedged-shaped cavity 54 therein, in integrally connected to the rear surface of enlarged portion 51 immediately below the bottom of notches 52. A second abutment member 55 is integrally connected to the rear surface of portion 51 a short distance above the top of notches 52.

In operation of connecting means 45, a preliminary position is attained when male portion 47 of the uppermost of two hanger sections 26 is inserted into female portion 46 of the lowemot of two hanger sections 26 to be connected such that member 48 passes through slot 50 and notches 52, and wedge 49 is received in cavity 54. Portions of the two sections 26 are grasped and pulled in opposite directions thus creating a separating force which is applied to male portion 47 and female portion 46 causing surface 62 of member 48 to abut surface 61 of member 55 and surface 56 of member 48 to slide into frictional engagement with surface 57 of portion 51; wedge 49 cams out of cavity 54 as portions 31 are pulled in opposite directions. Connecting means 45 is in locked position when wedge 49 is positioned such that surface 58 is spaced a short distance above surface 59 of member 53 and surface 60 of member 31 is in frictional contact with surface 63 of member 53.

In the locked position connecting means 45 has a load-carrying capability independent of the direction of any applied forces. Should an upward force be applied to the section 26 including male portion 47, or a downward force be applied to the section 26 including female portion 46, the abutment of surface 61 of member 55 with surface 62 of member 48 will retain connecting means 45 in the locked position. Should a downward force be applied to the section 26 including male portion 47, or an upward force be applied to the section 26 including female portion 26, surface 58 of wedge 49 will move against surface 59 of member 53 and retain connecting means 45 in the locked position. The contact of surface 60 with surface 63 and the contact of surface 64 with surface 65 in conjunction with the frictional engagement of surfaces 56 and 57 will retain connecting means 45 in the locked position against any horizontal or rotational force that may be applied to interconnected sections 26.

Fill hanger 26, including connecting means 45, is preferably molded of polyvinylchloride (PVC). PVC is highly impervious to chemical and corrosion degradation and retains high impact and tensile strength over a wide range of temperature conditions. PVC is self-extinguishing upon removal of direct contact with a flame. Although PVC is preferred, other plastic materials, known to the art, may be used in the practice of the present invention.

FIG. 9 shows an alternative method of hanging the fill hanger sections of the present invention in conjunction with concrete cooling tower 100. Fill hanger sections 140 are attached one atop of another and one alongside of another to form a single fill hanger 126 suspended from tee beams 110, positioned below hot water distributing pan 113, to immediately above cold water basin 117. By suspending the fill hanger in this manner intermediate fill supports are omitted, and this reduces resistance to air flow and resulting pressure drop. Further, the fill strip spacing pattern is continuous throughout the fill area because of the lack of interrupting supports thus eliminating undesirable air and water gaps.

Each hanger section 140 is attached to the hanger section immediately below by connecting means 45, discussed in detail above, to form a plurality or vertical sections 120 one alongside of another. Adjoining vertical sections 120 are secured to each other by horizontal stabilizers 130, illustrated in FIG. 10. Stabilizers 130 comprise a rectangular steel strap 131 having notches 132 cut-out at each end forming a pair of legs 133 and 134. Each end of legs 133 and 134 are turned downwardly, as shown in phantom lines in FIG. 10. Each stabilizer 130 connects together a pair of adjoining vertical sections 120 of two adjacent parallel hangers 126. Legs 133 and 134 are crimped around a horizontal member 33 of each vertical section 140 with adjoining vertical members 31 of two adjoining sections 120 positioned therebetween in cut-out 132, as seen in FIG. 10. Stabilizers 130 are positioned approximately six feet along adjoining sections 120 to serve the dual purpose of connecting the sections together and also to retain adjacent fill hangers 126 spaced at a fixed predetermined distance. This results in a rigid fill area structure with limited swaying.

As seen in FIG. 9, the hanger sections 125 adjacent inclined louver post 123 are cut to size so as to permit effective use of the entire fill area. The outer edges of hanger section 125, adjacent louver posts 123, are attached to louver posts 123 by transverse stabilizers 150. FIGS. 11 and 12 illustrate transverse stabilizers 150 as having angle iron member 151 having a vertical leg 152 and a horizontal leg 153. Crimping member 154, stamped out of both ends of vertical portion 152, is spaced a sufficient distance from vertical portion 152 to permit upstanding member 31 to pass therebetween. As seen in FIG. 11, transverse stabilizer 150 is positioned between hanger sections 125a and 125b so as to permit the vertical members 31, adjacent louver post 123, to be secured to the respective ends of stabilizer 150. Member 31 is secured by being crimped between member 154 and vertical portion 152. Portion 152 is attached to louver post 123 in a conventional manner, as by bolt 155. Transverse stabilizers 150 are spaced at sufficient intervals so as to prevent the fill hangers 126 from moving in a transverse direction away from posts 123.

It is now apparent that through utilization of fill hangers as described herein, the fill area assembly of a cooling tower may be placed in position in the tower in a minimum of time and with little maintenance being necessary during the life of the cooling equipment. Furthermore, the fill strips are secured in position to prevent them from fluttering, turning over or becoming displaced from the hanger structure due to wind and air currents. The fill hangers of the present invention permit the fill strips to be located within the tower so that maximum cooling of the water is obtained with a minimum of supporting structure.

Obviously, the invention is susceptible to some change or alteration without defeating its practicability and without departure from the basic principles upon which it is founded. We, therefore, do not wish to be confined to the preferred embodiments which are shown in the drawings and hereinbefore described except as the spirit and scope of the invention may be necessarily limited by the appended claims or reasonable equivalents thereof.

What is claimed is:

1. In a cooling tower wherein air is displaced to flow directionally generally laterally within the tower in cooling relation with dropping particulate liquid having a splash fill assembly positioned within the fill area of said tower, an improved fill assembly comprising:
   a. a plurality of fill strips positioned within said fill area;
   b. a plurality of spaced apart vertically suspended fill hangers positioned transversely with respect to said fill strips within said fill area, said fill hangers comprise a plurality of substantially horizontally and generally vertically extending members which intersect one another to form a plurality of parallelogram grids;
c. each of said fill strips being supported by the horizontal portion of one of said parallelogram grids of at least two of said fill hangers;
d. each of said fill hangers including a plurality of fill hangers sections which are attached one atop of another and one along side of another;
e. connecting means integral with said vertical members to connect said fill hanger sections one atop of another; and
f. horizontal stabilizer means to connect said fill hanger sections one alongside another and space said fill hangers a predetermined distance apart, said horizontal stabilizer means comprises a substantially horizontal strap having a U-shaped cutout at each end defining a pair of leg portions, said horizontal stabilizer means being positioned parallel to said fill strips between adjacent fill hangers so as to permit one leg of each end to be crimped about a horizontal member of one fill hanger section and the other leg of each end to be crimped about a horizontal member of a fill hanger section along side thereof with a vertical member of each section therebetween.

2. In a cooling tower wherein air is displaced, through a plurality of substantially horizontal louvers supported by a plurality of substantially vertical louver posts, to flow directionally generally laterally within the tower in cooling relation with dropping particulate liquid haivng a splash fill assembly positioned within the fill area of said tower, an improved fill assembly comprising:
a. a plurality of fill strips positioned within said fill area;
b. a plurality of spaced apart vertically suspended fill hangers positioned perpendicular to said louvers and transversely with respect to said fill strips within said fill area, said fill hangers comprising a plurality of substantilly horizontally and generally vertically extending members which intersect one another to form a plurality of parallelogram grids;
c. each of said fill strips being supported by a horizontal portion of one of said parallelogram grids of at least two of said fill hangers; and
d. transverse stabilizer means, secured intermediate its ends to said louver posts, to secure together a pair of said vertical members adjacent said louvers of two adjacent fill hangers, said transverse stabilizer means comprises a substantially vertically extending rectangular plate positioned between said adjacent fill hangers, each end of said plate including a crimpable member associated therewith secured at each end to one of said vertical members from each of said adjacent fill hangers and an aperture intermediate the ends of said plate to permit attachment of said transverse stabilizer to said louver post.

* * * * *